UNITED STATES PATENT OFFICE.

LEVY J. HENRY, OF NEW YORK, N. Y., ASSIGNOR TO D. BEURIMO, OF SAME PLACE.

IMPROVEMENT IN RENDERING FRICTION-MATCHES WATER-PROOF.

Specification forming part of Letters Patent No. 23,465, dated April 5, 1859.

*To all whom it may concern:*

Be it known that I, LEVY J. HENRY, of the city and State of New York, have invented, made, and applied to use a certain new and useful Improvement in Friction-Matches; and I do hereby declare that the following is a full, clear, and exact description of the nature and manner of applying my said invention to practice.

In the manufacture of friction-matches several attempts have heretofore been made to render the same water-proof. The wooden splints have been dipped into oil and wax previous to applying the phosphoric paste, and afterward have been coated with a varnish formed of shellac dissolved in alcohol or other preparation, all of which took some time to dry, and were otherwise difficult of application or unreliable in effect.

The nature of my said invention consists in dipping the match that has been tipped with the phosphoric compound into a melted mass of resinous matter, so that said gum hardens immediately on cooling, and is of sufficient thickness to render the match partially or entirely water-proof. It might be supposed that the heat from the melted mass would ignite said phosphoric paste; but such is not the case, for the atmosphere is excluded by the coating, and the dipping is so instantaneous that ignition does not take place.

I have found that where the matches tipped with phosphoric paste are dipped in melted shellac, rosin, or similar gums the waterproofing is perfect, particularly so where the match-splint has been dipped in wax or oil previous to being tipped.

In the manufacture of common and cheap matches I apply the foregoing process by first dipping the match-splints in the phosphoric paste and then into melted sulphur, which, being partially water-proof, protects the phosphorus from moisture, and also holds the same more firmly onto the match. By this method of manufacturing, the cost of the match is not increased, and a much more reliable and safe article is produced, because the phosphorus is not so liable to break off or be ignited by accidental friction. At the same time the match is protected from dampness under ordinary circumstances. Thus by using the sulphur after the phosphorus is put on, instead of before, in the usual way, highly beneficial results are produced.

It will be apparent that the melted coating material not only renders the match partially or entirely water-proof, but aids in communicating fire to the wood.

Having thus described my said invention and shown the benefits resulting therefrom, what I claim as new, and desire to secure by Letters Patent, is—

Rendering friction-matches partially or entirely water-proof by the application of a melted coating, in the manner and for the purposes substantially as specified.

In witness whereof I have hereunto set my signature this 29th day of January, 1859.

LEVY J. HENRY.

Witnesses:
LEMUEL W. SERRELL,
THOMAS J. HAROLD.